United States Patent [19]

Kimball et al.

[11] Patent Number: 4,928,269
[45] Date of Patent: May 22, 1990

[54] DETERMINING IMPEDANCE OF MATERIAL BEHIND A CASING IN A BOREHOLE

[75] Inventors: Christopher V. Kimball, West Redding; Fred E. Stanke, Ridgefield, both of Conn.; Curtis J. Randall, Missouri City, Tex.; Andrew J. Hayman, Voisins-le-Bretonneux, France

[73] Assignee: Schlumberger Technology Corporation, New York, N.Y.

[21] Appl. No.: 368,065

[22] Filed: Jun. 15, 1989

Related U.S. Application Data

[63] Continuation-in-part of Ser. No. 264,468, Oct. 28, 1988, abandoned.

[51] Int. Cl.$^5$ .................................................. G01V 1/40
[52] U.S. Cl. ....................................... 367/35; 181/105
[58] Field of Search ................ 364/422; 367/35, 34; 181/105

[56] References Cited

U.S. PATENT DOCUMENTS

| | | | |
|---|---|---|---|
| 3,401,772 | 9/1968 | Kokesh | 367/35 |
| 3,401,773 | 9/1968 | Synnott, III | 367/35 |
| 4,255,798 | 3/1981 | Havira | 367/35 |
| 4,703,427 | 10/1987 | Catala et al. | 364/422 |
| 4,709,357 | 11/1987 | Maki, Jr. | 367/35 |
| 4,733,380 | 3/1988 | Havira | 367/35 |
| 4,757,479 | 7/1988 | Masson et al. | 367/35 |

Primary Examiner—Thomas H. Tarcza
Assistant Examiner—Ian J. Lobo
Attorney, Agent, or Firm—Clifford L. Tager

[57] ABSTRACT

The present invention is directed to a method of calculating the impedance of a material behind the section of a casing. An acoustic excitation pulse is directed towards a section of the casing, resulting in a return waveform having a reverberation segment and an initial reflection segment. The return waveform is analyzed to choose a resonance frequency indicative of the casing's nominal thickness. The return waveform is bandpass filtered about the chosen frequency. A time window of the reverberation segment is selected, and the energy content in the time window of the filtered reverberation segment is calculated. Both the bandpass filter and time windows are selected based on the chosen resonance frequency, thereby removing variations in the thickness of the casing. The energy content calculation produces a cementation signal indicative of the impedance of the cement behind the section of the casing. The impedance value is indicative of the cement quality. In accordance with another aspect, a time portion of the initial reflection segment is chosen, and the energy content in the time window of the filtered initial reflection segment is calculated. This energy is used to normalize the cementation signal calculated from the reverberation segment. In accordance with another aspect of the present invention, the impedance of the material behind the casing is determined.

67 Claims, 9 Drawing Sheets

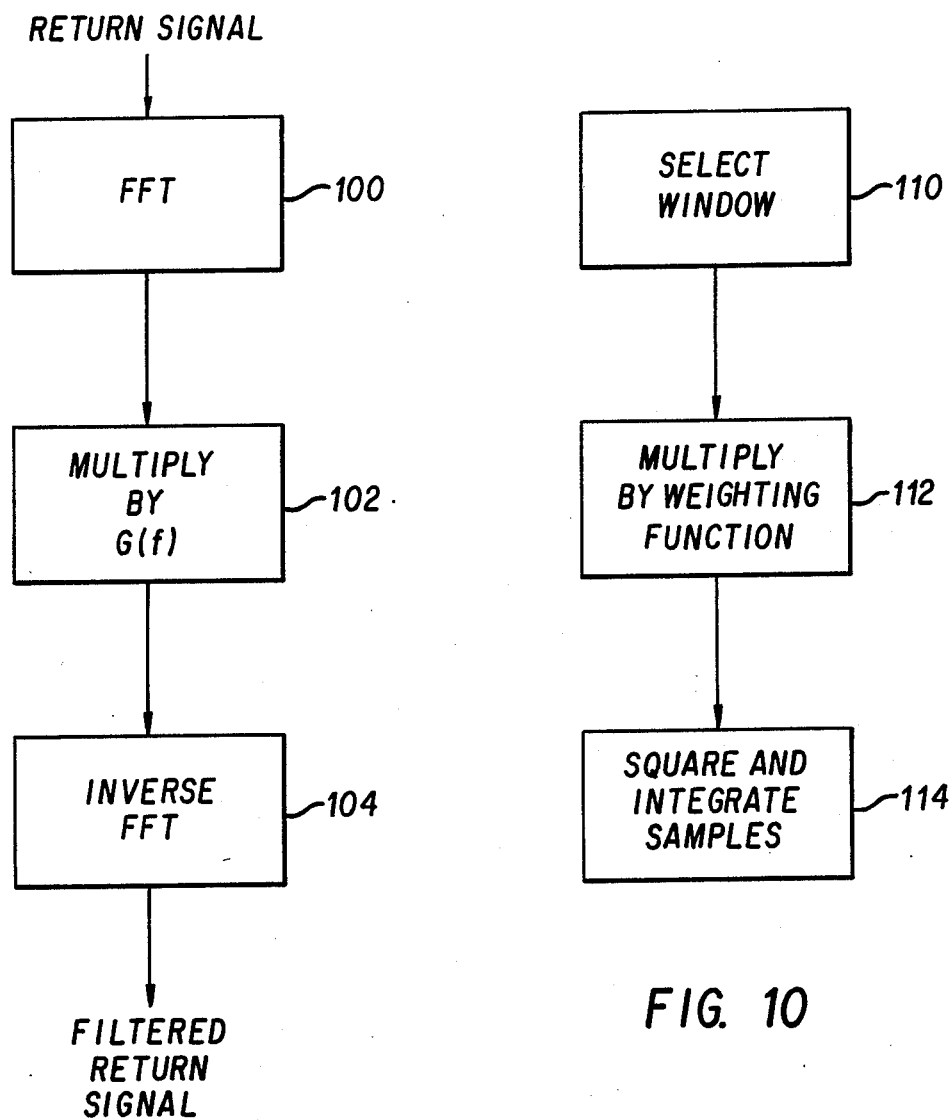

DETERMINING IMPEDANCE OF MATERIAL BEHIND A CASING IN A BOREHOLE

This application is a continuation-in-part application of application Ser. No. 264,469 filed Oct. 28, 1988, now abandoned.

BACKGROUND OF THE INVENTION

1. Technical Field

The present invention is directed to acoustically investigating a borehole. More particularly, the present invention is directed to calculating the impedance of a material, e.g., cement or borehole fluid, behind a section of a casing located in a borehole. The impedance of the material behind the section of the casing is indicative of cement quality.

As used herein, "cement quality" refers to the qualitative determination of the presence and solidification of cement behind a section of casing located in a borehole. As used herein, cement quality is either "good," indicative of the presence of cement which has properly solidified, or "bad," indicative either of an absence of cement or its failure to solidify.

2. Background Information

A borehole is typically an 8 to 12 inch hole drilled or bored into the ground during the exploration of oil and/or gas reserves. Should a reserve be found, and should it be determined that the reserve would be profitable for production, the borehole is lined with casing, typically steel, and the casing is cemented to the borehole. The cement provides hydraulic isolation between the layers of the formation traversed by the borehole. The area(s) of production are accessed by perforating the casing at the requisite locations, and production of the reservoir is begun.

The borehole is cased for several practical reasons. For example, the borehole may have intersected several different reservoirs, such as water, gas, oil, or any combination of these. Casing the borehole and perforating only at those locations from which production is desired insures that there is no production of undesirable areas. Additionally, the casing insures that fluids from the desired areas of production are not lost to other areas within the formation.

In a typical case, a well is drilled in an area, commonly referred to as a field, where the depth and location of producing reserves are known. During the drilling process, casing is typically laid at regular intervals.

In order to insure hydraulic isolation between zones in the formation traversed by the borehole, the casing is cemented to the borehole. Without the cement seal, the fluids under pressure from one zone may flow through the annulus between the casing and the borehole to other zones. If the fluid is not the fluid of interest, the production zone could become contaminated to such an extent that production is not viable. Further, without the seal, the fluid of interest could escape from the zone determined for production, thereby rendering production uneconomical.

In preparing to cement a section of the casing to the borehole, a one-way check valve is inserted at the end of the casing to be cemented and a determination is made of how much cement will be needed. The cement is forced down the center of the casing, followed by a heavier solution, commonly brine or heavy mud, to insure that all of the cement is forced through the check valve. The cement travels through the valve, and eventually around the annulus between the casing and the borehole.

As the solution is heavier than the cement, all of the cement will have been forced through the check valve by the time the solution reaches the valve. The solution is then evacuated from the center of the casing, the valve removed, and this sequence of drilling and cementing continues until lining of the well is complete.

Defects in cement quality include annuli between the casing and cement. The annuli may destroy hydraulic isolation between zones. However, annuli less than 100 microns wide, commonly referred to as "micro-annuli", are generally able to preserve fluid isolation between zones, and are therefore not considered defects. Other types of defects include channels, as well as complete voids in the cement.

Defects in cement quality can also occur due to improper hardening of the cement. Field engineers estimate the amount of cement to be placed in the casing, based on borehole conditions. Cement powder is mixed with water to form the cement. If the water content in the formation about the borehole is not adequately taken into account, portions of the cement may not properly harden, due to an excess of water in the cement mixture.

Defects in cement quality can also occur during the life of the well. The installed casing may be exposed to various corrosions due to chemically active corrosive solutions, electrolytic corrosion due to ground currents, or contact with dissimilar metals. Corrosion of the outside casing wall may result in fluid communication between zones, an undesirable effect as explained above. Further, the corrosion may cause the casing to deteriorate to such an extent that the casing itself could collapse, also destroying the well. Once casing is installed in a well, it is difficult or impossible to remove the casing for above-ground inspection. Thus, it is imperative to be able to check the cement quality of the casing in situ.

Early devices for measuring the cement quality employed a sonde having a sonic transmitter spaced longitudinally from a receiver by a given distance, e.g., three feet. The transmitter was located below the receiver. The transmitter would produce a sonic pulse which would travel up through the casing to the receiver. The received signal was integrated over time, and based on the resulting integration, an indication of cement quality was obtained.

Theoretically, if the cement quality is good, the acoustical energy from the sonic pulse in the casing attenuates rapidly because it escapes through the cement seal and surrounding formation, due to the good mechanical coupling between the casing, cement and formation. Thus, the received signal should have a low amplitude. Conversely, if the cement quality is bad, the energy remains trapped in the casing and the received signal should have a relatively higher amplitude.

This device has several practical shortcomings. The spacing of the transmitter and receiver, typically 3 feet, inherently reduces the tool's resolution in the depth direction. Thus, it becomes difficult, if not impossible, to locate the true depth of the defect in cement quality. Additionally, as the tool is azimuthally symmetric, it is not possible to locate the relative azimuth of the defect in cement quality. Without such azimuthal information, it is not possible to determine what type of defect lies behind the casing.

Further, any tool eccentering, defined as a misalignment between the tool's center and the borehole's center, produces inaccurate cement quality determinations. Further still, due to the integration technique employed and the dependance on mechanical coupling to yield a cement quality determination, even slight micro-annuli which are adequate for sealing, but fail to provide good transfer of energy between casing/cement/formation interfaces, tend to produce false readings of poor cement quality.

The prior art has attempted to improve depth resolution by employing a transmitter/receiver pair having zero longitudinal offset, and has attempted to determine azimuthal resolution by effectively employing a plurality of transmitter/receiver pairs spaced about the perimeter of the tool. A prior art device which incorporates both features is shown, for example, in U.S. Pat. No. 4,255,798 issued to Havira, assigned to the same assignee as the present invention, and incorporated herein by reference.

Havira employs an acoustic pulse-echo technique having either a single transducer capable of directing its pulse at various azimuths or a plurality of transducers azimuthally located about the tool. Havira's technique for cement quality determination is dependent upon casing thickness. Thus, the transducer transmits a pulse having a frequency spectrum selected to stimulate the casing so as to produce a casing thickness resonance. The received signal includes an initial reflection segment, due largely to the reflection of the pulse off the casing's inner surface, and a reverberation segment, due largely to the subsequent reverberations from the resonating casing section. The reverberation segment is indicative of the energy of the echo produced by the casing-cement interface.

In Havira's preferred embodiment, the return waveform is amplified and rectified to obtain the d.c. signal representation of the amplitude of the waveform. This signal is filtered to obtain a signal representative of the envelope of the waveform. The circuitry processes the initial reflection and the reverberation segments separately. At the start of the return waveform, a pulse generator enables a gated amplifier, allowing the peak value of the initial reflection segment to be calculated and stored. The width of the pulse from the pulse generator is selected to enable the entire initial reflection segment to pass through the amplifier.

Thereafter, a second pulse generator enables a second gated amplifier, allowing the energy of the reverberation segment to be calculated by an integrator and stored. The width of the pulse from the second pulse generator selects a predetermined portion of the reverberation segment. The calculated reverberation segment energy is divided by the peak value to generate a normalized cement-bonding signal in order to remove the effects of tool tilt and borehole fluid anomalies.

The preferred frequency spectrum of Havira's acoustic pulse transmitter has a 6 dB bandwidth extending from about 275 kHz to about 625 kHz with a peak at about 425 kHz. This spectrum includes both the frequency of the fundamental thickness resonance for typical casing thicknesses, as well as higher order resonances in thicker casings. The received signal therefore includes the effects of both the fundamental and higher order resonances.

Havira overcomes many problems theretofore inherent in the prior art. For example, Havira is able to compensate for eccentering and the presence of micro-annuli. Additionally, Havira is able to resolve cement quality with a greater depth, as well as azimuthal, precision. However, wideband signal processing with fixed time windows leads to several inaccuracies in the determination of cement quality. For example, the wideband signal processing leads to inaccuracies due to the inclusion of unwanted noise components and phase variations between resonances. Additionally, processing with fixed time windows leads to inaccuracies due to the fact that the temporal portion of the reverberation segment signal indicative of cement bond varies with casing thickness.

The information indicative of cement quality is located in a narrow frequency band about the frequency of the casing's thickness resonance in the reverberation segment. By processing signals outside of this narrow band, wideband signal processing techniques include extraneous information which corrupts the cement quality determination.

Also, the resonances at different frequencies interfere with one another in a way which depends on the transducer, borehole fluid and other environmental effects. These effects, although unrelated to cement quality, nevertheless affect the signal which is used to determine cement quality.

Additionally, the segment of the reverberation segment containing information indicative of cement quality, e.g., bonding between the casing/cement interface, varies according to casing thickness. A thicker casing will produce a longer reverberation segment than will a thinner casing, given the same cement quality. These changes are not fully removed by the thickness normalization technique of Havira. Thus, by utilizing a fixed time window, the cement quality determination may not be correct.

SUMMARY OF THE INVENTION

The present invention is directed to a method of calculating the impedance of a material behind the section of a casing. An acoustic excitation pulse is directed radially towards a section of the casing. The bandwidth of the excitation pulse is selected to stimulate the section at its thickness resonances. Acoustic returns resulting from the interaction of the excitation pulse with the casing, cement and borehole produce a return waveform having a reverberation segment, resulting mainly from the thickness resonances, and an initial reflection segment, resulting mainly from the reflection off the casing's inner surface.

The return waveform is analyzed to choose a resonance frequency near a predetermined frequency indicative of the casing's nominal thickness. The return waveform is bandpass filtered about the chosen frequency. A time portion of the reverberation segment is chosen, and the energy content in the time window of the filtered reverberation segment is calculated. The energy content calculation produces a cementation signal indicative of the impedance of the cement behind the section of the casing. The impedance value is indicative of the cement quality. Alternatively, the time portion can be chosen prior to filtering.

In accordance with another aspect of the present invention, a time portion of the initial reflection segment is chosen, and the energy content in the time window of the filtered initial reflection segment is calculated. As above, the time portion can be chosen prior to filtering. This energy calculation, representative of the energy of the acoustic reflection from the inner surface of the casing section, is used to normalize the cementation signal calculated from the reverberation segment. The normalized signal results from squaring and summing the values in the selected filtered portion of the initial reflection segment. The normalized cementation signal is the logarithm of the ratio of the cementation signal to the normalized signal. The logarithm causes the normalized cementation signal to be proportional to the impedance of the material behind the section of casing.

In accordance with another aspect of the present invention, a calibration waveform is derived from a situation where the impedance of the material behind the section of casing is known. The calibration signal results from the application of the processing steps which produce the normalized cementation signal to the calibration waveform. A calibrated difference is a function of the calibration signal and the normalized cementation signal.

Based on the value of the calibrated impedance, the cement quality can be determined. For example, based on predetermined impedance values of good and bad cement quality, the calibrated impedance is compared to a threshold value of impedance representing good cement quality. If the calibrated impedance value is at or above the threshold, the cement quality behind the section of casing examined is good.

BRIEF DESCRIPTION OF THE DRAWINGS

FIG. 9 is a flow diagram showing the preferred embodiment of the selection of a band of frequencies from the digitized measured waveform using a digital computer.

FIG. 10 shows how a portion of the casing reverberation segment in the return signal is preferrably selected.

DETAILED DESCRIPTION OF THE PREFERRED EMBODIMENT(S)

Figure 1:
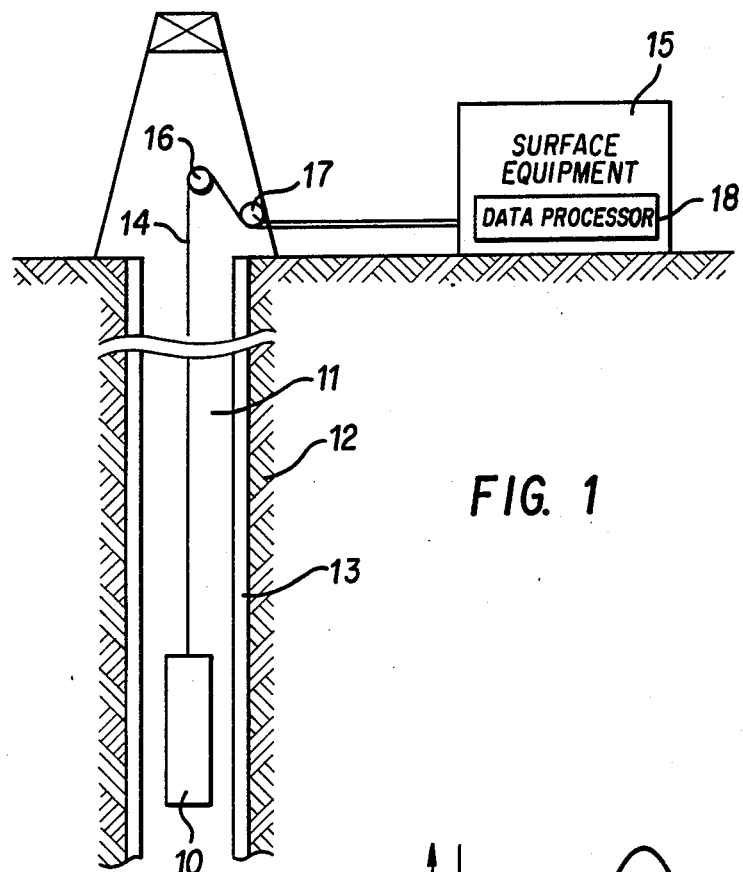
FIG. 1 is a schematic of a borehole logging operation in which the present invention may be advantageously employed.

Turning now to FIG. 1, a schematic diagram of a logging operation is shown. Tool, or sonde, 10 for evaluating cement quality is located in borehole 11 penetrating earth formation 12. Casing 13 is cemented to the walls of the borehole, as explained in detail with reference to FIG. 3, below. The sonde is preferably lowered in the borehole by armored multi-conductor cable 14 and slowly raised by surface equipment 15 over sheave wheel 16 while cement quality measurements are performed. The depth of the tool is measured by depth gauge 17, which measures cable displacement.

Sonde 10 measures cement quality by emitting an acoustic pulse and analyzing its return waveform. The sonde is capable of obtaining cement quality measurements azimuthally, and is preferably of the design described in U.S. Pat. No. 4,255,798 issued to Havira, assigned to the same assignees as the present invention, and herein incorporated by reference. The sonde measures cement quality by emitting acoustic excitation pulses and analyzing the return waveforms produced as a result of reflections from the casing, as well as reverberations of the casing. The return waveforms can be analyzed by the sonde in situ, analyzed by data processor 18 at the surface, or stored, either in the sonde or at the surface, for analysis at a remote location. In the preferred embodiment, the return waveform data is transferred to data processor 18 by cable 14, where the cement quality is determined.

The excitation pulse preferably excites a thickness resonance of the casing. As is known in the art, such resonance traps energy in the casing. The subsequent reduction of trapped energy in the casing may be considered the result of leakage attributable to the degree of acoustic coupling to adjacent media. All resonances excited by the excitation pulse trap energy in this manner.

It is possible to design a sonde having a plurality of transceivers, each of which generates excitation pulses which excite the fundamental resonant frequency for each of the plurality of different nominal casing thicknesses encountered. The preferred embodiment, however, includes one transceiver having an excitation pulse which excites either the fundamental resonance, or a harmonic thereof, for the wide range of casing thicknesses typically encountered. The acoustic pulse is, therefore, preferably highly damped and of short duration on the order of eight microseconds or less. The frequency spectrum of the acoustic pulse, shown with reference to FIG. 2, preferably has a 6-dB bandwidth of about 400 kHz centered at about 450 kHz.

Figure 2:
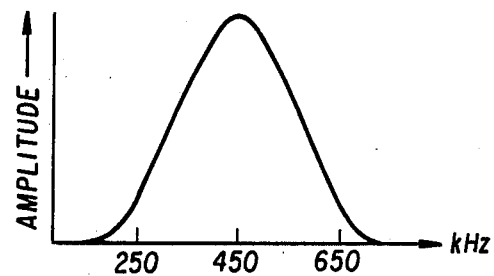
FIG. 2 shows the frequency spectrum of an acoustic excitation pulse from the sonde shown in FIG. 1.
Figure 3:
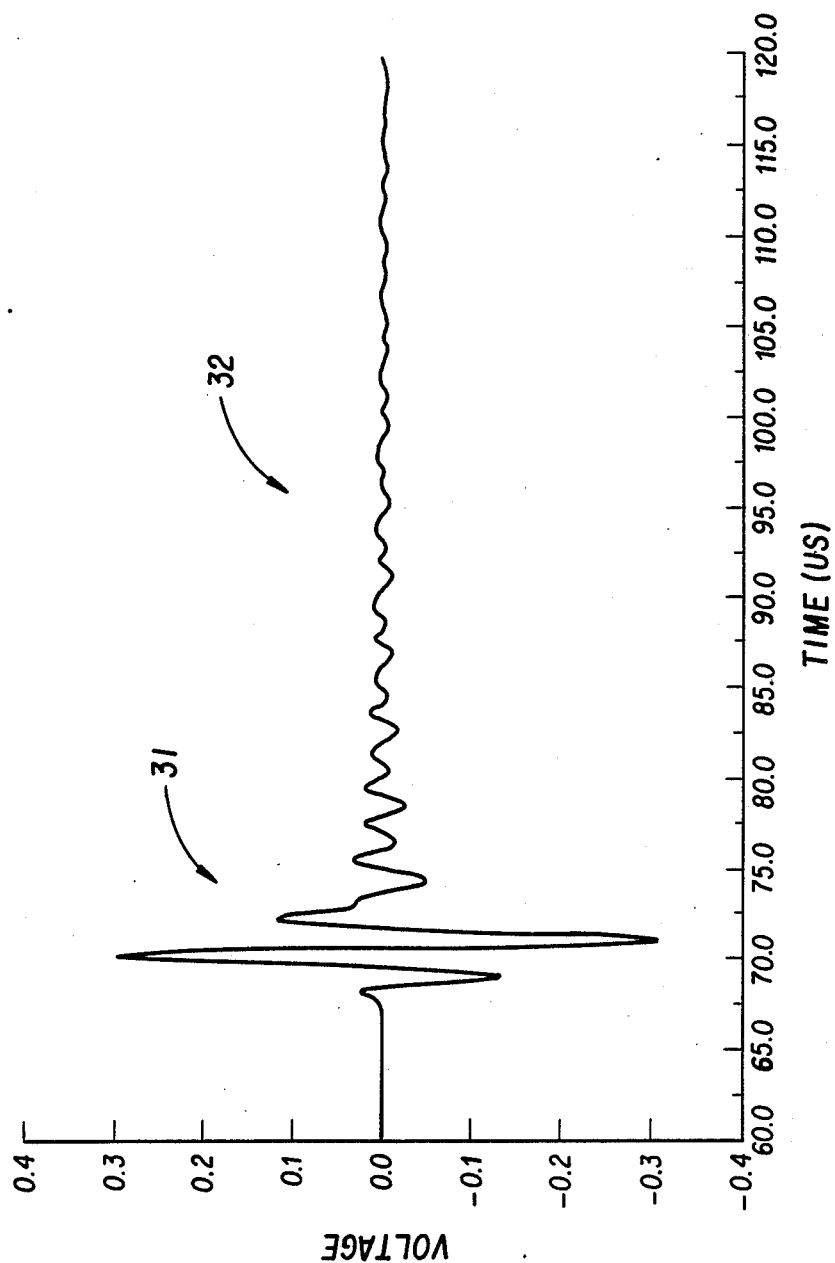
FIG. 3 illustrates a typical return waveform produced as a result of the acoustic pulse shown in FIG. 2.

Turning now to FIG. 3, a typical return waveform from a casing excited by the acoustic pulse of FIG. 2 is illustrated. The return waveform, a typical response from a steel casing of approximately 7 inches in diameter, includes initial reflection segment 31 and reverberation segment 32. The initial reflection segment is due primarily to the reflection of the pulse from the inner surface of the casing. The magnitude of the initial reflection segment is a function of borehole fluid (e.g., composition of the mud), casing surface conditions, alignment of the sonde, as well as transceiver output.

The portion of the excitation pulse not immediately reflected enters the casing and excites the resonances in the casing, as discussed in detail above. Thus, the reverberation segment is due primarily to acoustical energy which was trapped in the casing, leaks back into the borehole fluid, and propagates back to the receiver. The relative amplitude and duration of the reverberation segment is a function of the amount of energy transferred from the casing to the formation via the cement therebetween. As is well known, the amount of transferred energy is a function of the characteristics of the cement seal coupling the casing and formation. Good cement quality would transfer more energy than would poor cement quality. Therefore, the casing resonances decay more rapidly for good cement quality than for poor cement quality. The waveform shown with reference to FIG. 3 has relatively rapid decay which is indicative of good cement quality. Lack of cement adhesion produces an error in the quantitative determination of impedance. However, the error in the apparent impedance due to lack of adhesion is small compared to the difference in impedance between typical good cement and that where cement is absent.

Figure 4:
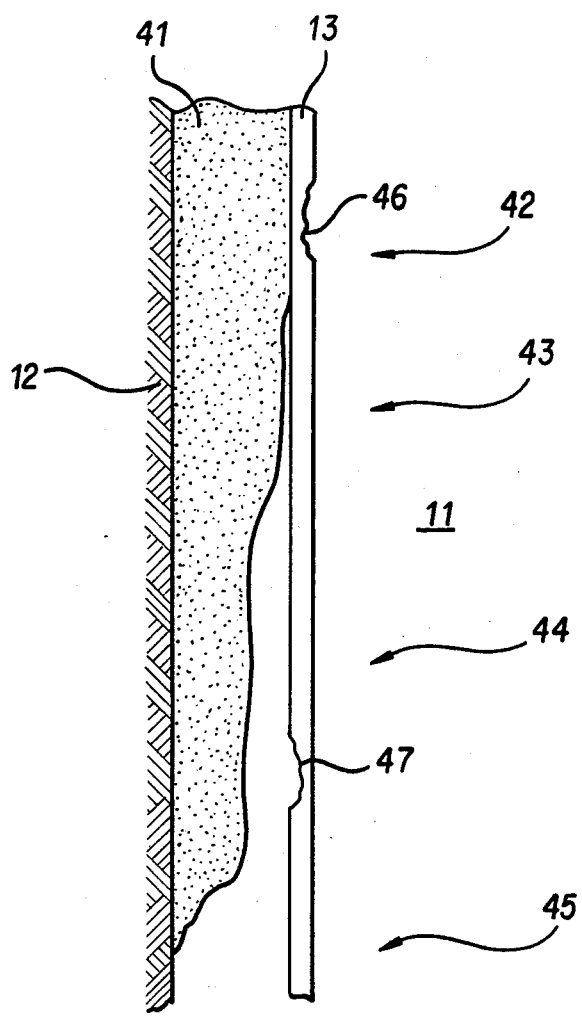
FIG. 4 depicts the left-side of the borehole shown in FIG. 1, lined with a casing, illustrating possible cement quality defects, as well as a tool, in situ, for investigating the cement quality behind the casing.

Turning now to FIG. 4, the various bonding states of cement which may exist in a borehole after cementation are illustrated, wherein the left side of borehole 11 is depicted. Cement 41 is shown adhering to formation 12 and casing 13 at region 42, having a hydraulically secure microannulus at region 43, having an enlarged annulus at region 44 such that vertical zone separation is compromised and having a cement-free region 45. The cement conditions of regions 42 and 43 are to be evaluated as good cement quality, while those of regions 44 and 45 are to be evaluated as poor cement quality.

External and internal corrosion is shown at 46 and 47, respectively. Such corrosion may occur at any place in the casing and can be particularly harmful when corrosion leads to hydraulic communication between zones which must remain hydraulically isolated from each other. The corrosion may also present itself, in advanced stages, as complete erosion of a section of the casing. Therefore, there is particular utility in accurately measuring casing thickness, enabling one to isolate a potential problem with the casing.

The return waveforms are analyzed by data processor 18 of FIG. 1 in accordance with the preferred method of the present invention, as now discussed with reference to FIG. 5. A plurality of acoustic excitation pulses at different azimuths are produced for each depth, thereby allowing the sonde and associated elements to determine cement quality with azimuthal precision. For the sake of discussion, the processing of only one waveform will be discussed. It is to be understood, however, that the following discussion applies equally to the plurality of the waveforms to determine cement quality.

At step 501, a time reference $t_r$ is determined for the return waveform. The time reference is preferably the first zero-crossing before the maximum absolute amplitude of the return waveform. Other time references can be employed, so long as all subsequent processing parameters defined hereinbelow are adjusted accordingly.

The return waveform is a wideband signal, with the initial reflection segment containing energy across the frequency range of the excitation pulse generated by the transducer; the reverberation segment contains energy in narrow bands about the frequencies of the thickness resonances. At step 502, the data processor (FIG. 1) determines a chosen frequency $f_0$ as follows. The power spectrum of the waveform within a predetermined frequency-determination window is calculated. Using the equation $f_n = nv_c/2d$, $f_1$ is calculated; if $f_1$ is within a predetermined useable bandwidth of the transducer, $f_1$ is deemed the nominal frequency. Otherwise, $f_2$ is calculated and compared with the useable bandwidth of the transducer. This process continues until a nominal frequency within the useable bandwidth is determined. In the preferred embodiment, the transducer bandwidth is selected such that $f_1$ is the nominal frequency.

In the above equation, $v_c$ is the compressional velocity of the steel casing and d is the nominal casing thickness, both known quantities. The useable bandwidth can be defined as the 10 dB bandwidth about the center frequency of the transducer. However, the useable bandwidth is preferably determined according to the transducer employed as well as the signal-to-noise ratio of the system. Additionally, the predetermined frequency-determination window is preferably a Gaussian window whose center occurs 20 μsec after $t_r$, having a standard deviation of 12 μsec, and having a centered total duration of 24 μsec.

Once the nominal frequency has been selected, the power spectrum is examined within a predetermined range of frequencies, preferably −20% to +33%, about the selected nominal frequency to find the peak of the power spectrum, thereby yielding the chosen frequency $f_0$.

At step 503, the return waveform is bandpass filtered about the chosen frequency in order to produce a narrowband signal. In the preferred embodiment, the bandpass filter is centered about the chosen frequency, has an effective half-bandwidth B such that $B = f_0/N_b$, has a Gaussian shape with a standard deviation B, and a total bandwidth 2B. $N_b$, a dimensionless quantity, is preferably selected such that a single resonance dominates the bandwidth and further that the noise energy is reduced without distorting the resonance at the chosen frequency $f_0$. In the preferred embodiment, $N_b$ is equal to 8. Alternatively, other bandpass filters can be employed.

This step improves results in several ways. First, by creating a narrowband signal, step 503 limits the noise content of the processed signal, thereby improving the signal-to-noise ratio. Second, by processing a narrowband signal dominated by a single thickness resonance, the processed signal is independent of the relative phases and amplitudes of other thickness resonances in the reverberation segment. If multiple resonances were present, the combination or cancellation of their energies depending on their relative phases and amplitudes may cause error in the measurement. Step 503 eliminates this dependency by providing a frequency band with a single resonance which is used for processing. Third, the reverberation segment is less dependent on variations in the frequency spectrum of the acoustic excitation pulse, as long as the spectrum includes the resonance being processed, thereby yielding a result virtually independent of transducer output variations and of environmental conditions which effect the excitation pulse.

In step 504, a portion of the reverberation segment of the narrowband signal from step 503 is selected based on the time reference and the chosen frequency. The starting time and length of the portion are normalized to the chosen frequency, $f_0$, so that portions for different return waveforms start the same number of resonant periods after the time reference, $t_r$, and contain the same number of resonant cycles. The starting time, $t_s$, is defined as $t_s = t_r + N_d/f_0$, where $N_d$ is a dimensionless, possibly non-integral number. This portion therefore, starts $N_d$ resonant periods ($1/f_0$) after the time reference $t_r$. The length of this portion is defined as $t_l = N_l/f_0$, where $N_l$ is a dimensionless, possibly non-integral number, so that the segment contains the same number of resonant cycles independent of the thickness of the section of the casing being investigated.

The scaling of parameters $t_s$ and $t_l$ to $1/f_0$, therefore, causes all portions of reverberation segments from return waveforms from all sections of the borehole to start the same number of resonant periods after the time reference and to consist of the same number of resonant periods, independent of changes in the resonant frequency due to variations in the casing thickness and in the measurement transducers generating the acoustic excitation pulses. This permits the direct comparison of the results obtained from measurements taken at all positions within the casing.

Optionally, the data within the selected portion of the narrowband signal in step 504 may be weighted to provide a better measure of the average resonant energy content of the selected signal. Providing the data in the middle of the segment with greater weight limits "end effects", due to offsets and jitter in the sampling or measuring electronics.

The energy content, $E_t$, of the filtered portion of the reverberation segment of step 504 is determined at step 505 by squaring and summing the result of step 504. The result represents the energy contained in the selected portion of the reverberation segment of the narrowband signal and indicates the cement quality. If the cement quality is good, the result from step 505 is low, since more energy is transferred to the cement, causing the casing thickness resonance to decay more quickly. Conversely, if the quality is bad, $E_t$ is relatively high, since the decay of the resonance is slower.

Although the result of step 505 is indicative of the cement quality, $E_t$ nevertheless depends on the amount of energy from the acoustic excitation pulse reaching the casing, which is not related to the cement quality. The amount of energy reaching the casing varies with the transducer, borehole fluid attenuation and alignment of the tool. To account for these variations, the data processor preferably performs steps 506, 507 and 508, thereby normalizing the result from step 505.

At step 506, the norrowband signal from step 503 is processed to extract a portion of the initial reflection signal whose energy content is proportional to the incident energy at the frequency of the resonance being processed. The portion is selected in the same manner as is used to select the portion of the reverberation segment, but with a time interval selected within the initial reflection segment. As with the reverberation segment portion, the starting time is a function of the time reference and is defined as $t_s' = t_r + N_d'/f_0$ where $N_d'$ is a dimensionless, possibly non-integral number. As in step 504, the data within the selected segment may be optionally weighted to provide a better measure of the average energy content in the initial reflection segment.

At step 507, the energy content of the selected portion of the initial reflection segment, $E_h$, is determined by squaring and summing the result. At step 508 the energy determined from step 505, $E_t$, is normalized by dividing it by the energy determined from step 507, $E_h$, thereby eliminating variations due to changes in the amount of incident energy reaching the casing.

Figure 5:
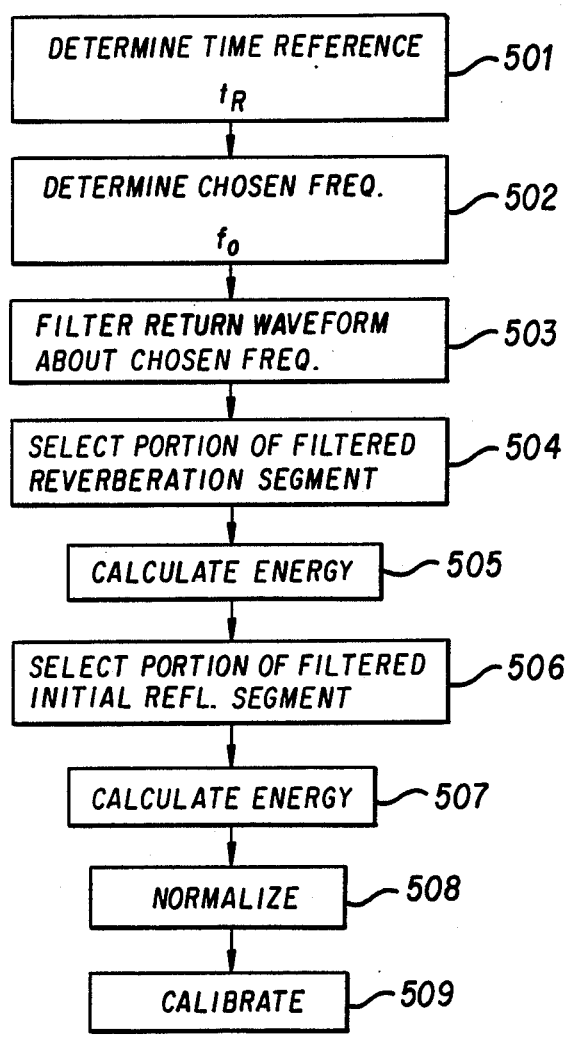
FIG. 5 shows the preferred embodiment of the method of the present invention.
Figure 6:
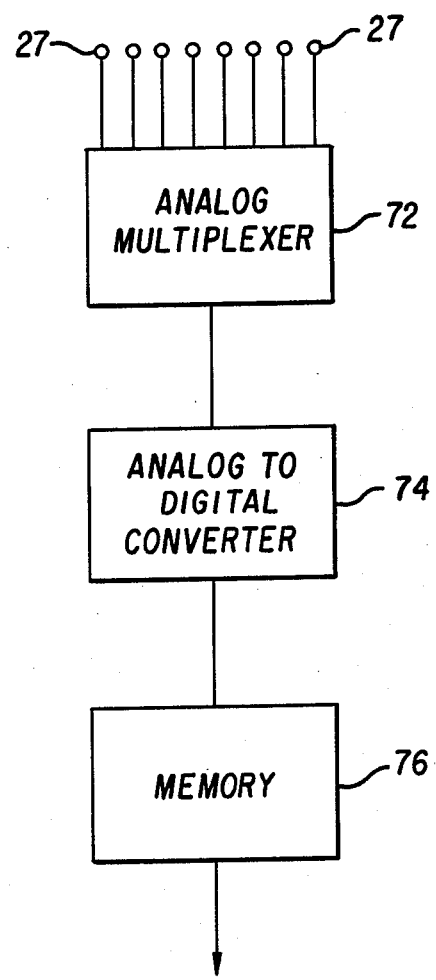
FIG. 6 shows the preferred embodiment of the apparatus for converting the measured waveform into digital format and storing the results in memory.

In the preferred embodiment, the data processor includes a digital computer programmed to process the measured waveforms in digital form according to the steps shown in FIG. 5. Referring to FIG. 6, apparatus for converting the measured waveform from analog to digital form for the computer is illustrated. The tool preferably includes eight sequentially operated measurement transducers 27 that transmit and receive acoustic signals to provide circumferential information. Each transducer, in turn, generates a series of acoustic excitation pulses and receives the resulting waveforms. The measured waveforms are transmitted to a corresponding input of the analog multiplexer 72, which connects the output of each transducer in turn to an analog to digital converter 74. The analog to digital converter 74 samples the return signals and converts them to digital form for storage in memory 76. The multiplexer 72, analog-to-digital converter 74, memory 76 and data processor may be located either in the tool or at the surface.

Figure 7:
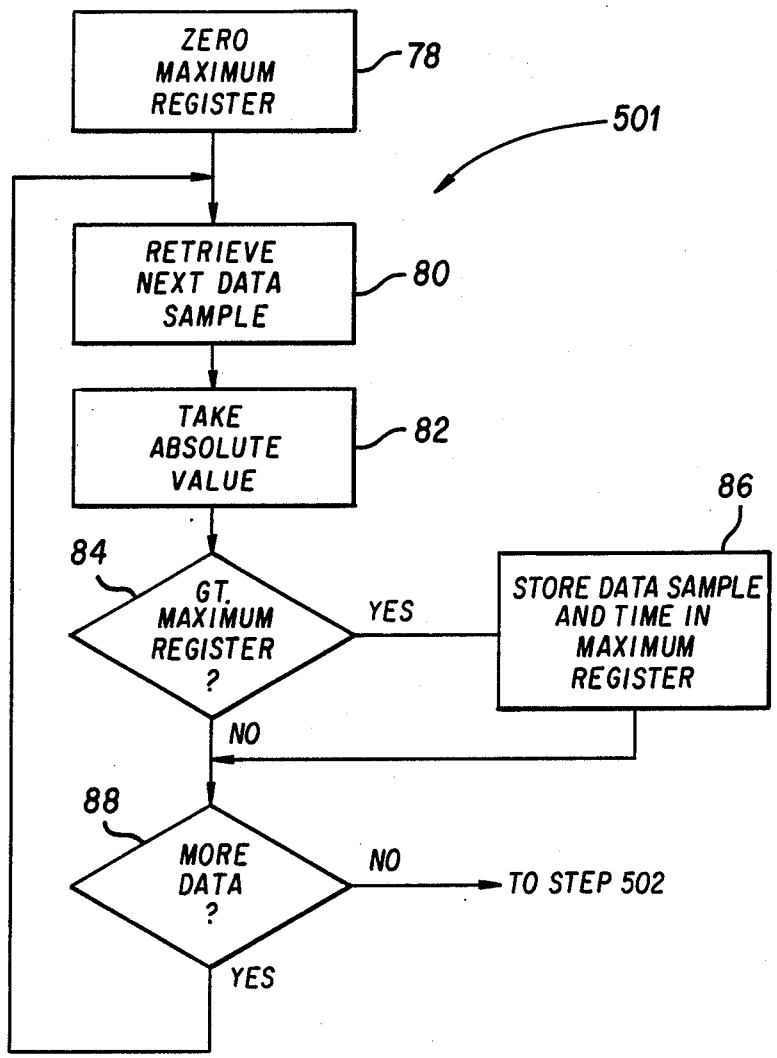
FIG. 7 is a flow diagram showing the preferred embodiment of an implementation of the time reference generation on a digital computer.

FIG. 7 shows the implementation of step 501 in the preferred embodiment, wherein the time reference, $t_r$, within each measured waveform is determined. Step 78 initializes to zero the register used to store the current maximum absolute amplitude of the digitized return signal and the time when it occurred. In step 80, the next digitized data word from the memory 76, representing the amplitude and the corresponding time of a sample from a return signal, is retrieved from memory 76 and its absolute value is determined in step 82. In step 84, the absolute value of the amplitude is compared with the current maximum amplitude stored in the register. If the new amplitude is greater than the current maximum stored, then in step 86 the contents of the register are updated with the new amplitude and time. In step 88 the program checks for the next sample of the return signal. The above steps are repeated until all the samples of the return signal have been processed. Thereafter the data stored in the memory 76 is examined for the first point before a zero crossing occurring before the maximum stored in the register and the time of that point is assigned as the time reference $t_r$.

Figure 8:
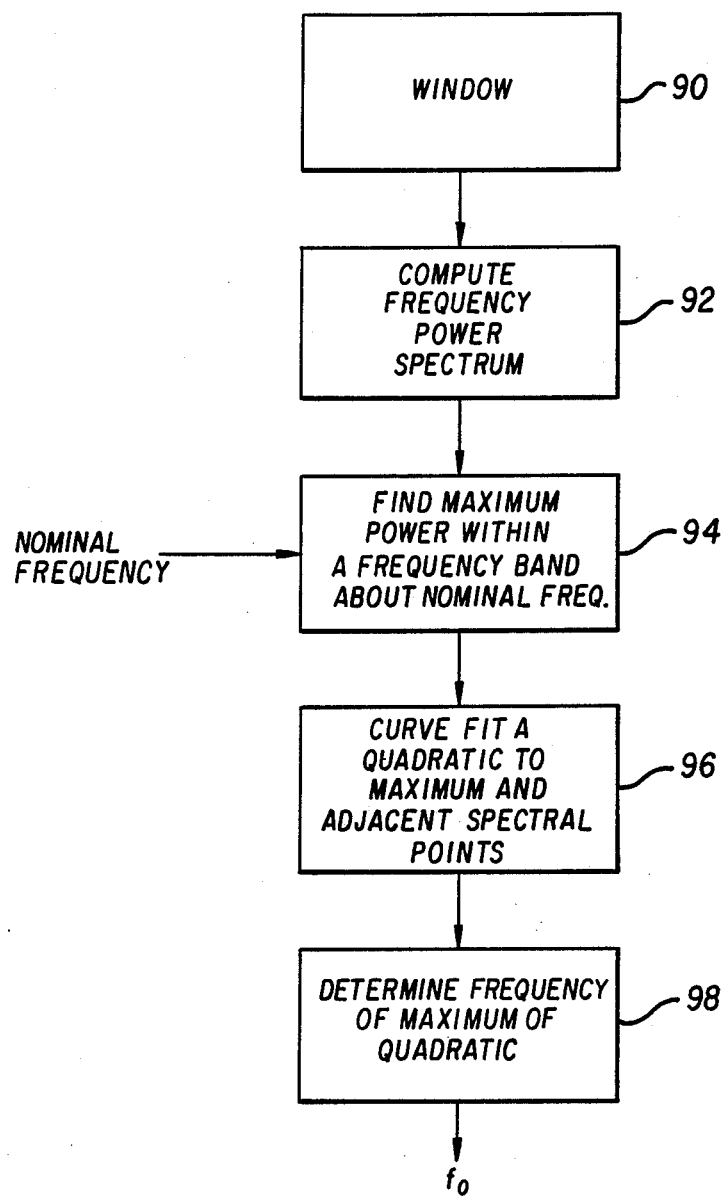
FIG. 8 is a flow diagram showing the preferred embodiment to determine the chosen frequency of the section of borehole casing being investigated.

The determination of the chosen frequency, $f_0$, in step 502 is made in the preferred embodiment by analyzing in the frequency domain a portion of the reverberation segment to find the frequency of maximum power, in accordance with the steps shown in FIG. 8. In step 90, preferably, a fixed length window of 24 us is applied to the return signal, preferably starting 8 us after the time reference to obtain a portion of the reverberation segment of the return signal. The window is preferably Gaussian shaped as described above with reference to step 502, (i.e., centered in the center of the window and being two standard deviations in length) although any of the known windows, such as Blackman, Hamming or rectangular, may be used. The power spectrum of the windowed waveform is computed in step 92, and the maximum power within a frequency band of $-20\%$ to $+33\%$ about the nominal frequency, as determined from the nominal casing thickness, is found in step 94. In step 96, the computer fits a quadratic equation to the maximum point determined in step 94 and to the two adjacent spectral points. The frequency of the maximum of the quadratic function is determined in step 98 as the chosen frequency, $f_0$.

Referring to FIG. 9, the implementation of step 503 in the preferred embodiment is shown. A filter 102 is shown that selects the narrow band of frequencies within the return signal, with an effective half bandwidth, $B = f_0/N_b$ and a center frequency, $f_0$. In the preferred embodiment, $N_b = 8$, so that an effective half bandwidth of 12.5% of the chosen frequency is processed. The digitized return waveform is converted into the frequency domain in step 100 by performing a Fourier Transform on the digitized data of the return waveform. The filter is implemented in step 102 by multiplying the Fourier Transform of the return signal by a Gaussian function, $G(f)$, where $$G(f) = \frac{e^{-0.5((f-f_0)/(f_0/N_b))^2}}{\sqrt{2\pi}\ (f_0/N_b)}$$

Although a Gaussian filter with a standard deviation scaled to $f_0$ is specified here, any filter which narrows the bandwidth of the return waveform such that it is dominated by a single resonance may be used. Alternatively, the filter may be applied as convolution with the filter's impulse response. The filtered signal is converted back into the time domain by performing an inverse Fourier Transform on the frequency domain signal, in step 104.

FIG. 10 of the drawings illustrates the implementation of steps 504 and 505 in the preferred embodiment, wherein a portion of the reverberation segment of the narrowband signal is weighted and the energy content of the resulting signal is determined. In step 110, a windowing technique is utilized to select the portion of the casing reverberation segment according to the specifying parameters, $N_d$ and $N_l$, which are chosen such that the selected portion represents the resonant energy in the walls of the casing. The preferred embodiment utilized $N_d=4$, so that the window starts at time $t_s$ occurring four resonant cycles after the time reference and $N_l=3$, so that the window spans three resonant cycles. These parameters were determined empirically so that the selected portion of the casing reverberation segment accurately represents the energy resulting from casing resonance and does not include energy resulting from the interaction of the acoustic excitation pulse with other borehole media, such as formation reflections from the earth formation. Other implementations with different parameters are possible.

In step 112, the windowed signal is weighted, so as to provide a better representation of the resonant energy within the casing walls. A Gaussian time function is utilized to provide greater weight to the samples toward the center of the window to limit end effects.

Assuming $t_r=0$, the Gaussian function utilized in step 112 is defined as follows:

$$G_t(t) = \frac{e^{-0.5(\frac{t-(N_d+(N_1/2))/f_0}{N_1/2f_0})^2}}{\sqrt{2\pi}\ (N_1/2f_0)}$$

The standard deviation of the Gaussian function, therefore, is scaled by $1/f_0$. Although a function with a Gaussian distribution is utilized in the preferred embodiment, any function which properly weights the windowed signal, such as the Hamming, Blackman or Kaisar functions may be used.

In step 114, the energy content of the weighted signal is determined. The processor squares each weighted sample within the specified window and totals the values. The sum is representative of the cement quality.

Steps 506 and 507, wherein a portion of the narrowband signal from the initial reflection segment is weighted and the energy content of the resulting signal determined, are implemented by the processor with the steps as illustrated in FIG. 10. The parameters specifying the window, $N_d'$ and $N_l'$, are selected so that the second windowed signal is centered on the reference time, $t_r$, (i.e. $N_d' - N_l'/2$) and includes four resonant cycles (i.e. $N_l'=4$). The second window, therefore, selects an earlier portion of the narrowband signal. These numbers were determined empirically to yield a signal representing the energy reflected from the casing, while not substantially including energy resulting from the interaction of the acoustic excitation pulse with other borehole media. Other implementations with different parameters, however, are possible. The weighting function from step 112, while serving the same purposes as before, is also adjusted to account for changes in the time of the second window. The new weighting function, $G_h(t)$, is defined as:

$$G_h(t) = \frac{e^{-0.5(\frac{t-(N'_d+(N'_1/2))/f_0}{N'_1/2f_0})^2}}{\sqrt{2\pi}\ (N'_1/2f_0)}$$

Again, the parameters of the Gaussian are scaled to $1/f_0$ and other functions or variations on this function may be used.

The normalized cementation signal from step 508 may be calibrated at step 509 with a calibration signal to provide a measure of the acoustic impedance of the cement. The calibration signal is obtained from a calibration waveform through the same processing steps used to generate the cementation signal. To obtain the calibration waveform, the borehole fluid is allowed to fill the volume between the calibration section and the transducer, and the volume behind the calibration section is filled with a medium having as its impedance the calibration impedance. The same or substantially similar measurement transducer used in the generation of the return waveform, interrogates the calibration section of casing, whose characteristics are substantially similar to those of the measured section. It is assumed that the impedance of the borehole fluid is known. The geometric relation of the transducer to the calibration section is substantially the same as that for the measurement transducers and the measured sections.

Alternatively, the calibration waveform may be generated from a sufficiently accurate mathematical model, or from an independent measurement which either employs the transducer used to produce the normalized cementation signal or one which is substantially similar.

The calibration signal results from processing the calibration waveform according to the same steps used to generate the cementation signal. A calibrated difference results from subtracting the calibrated signal expressed in decibels from the cementation signal expressed in decibels. The calibrated difference is then divided by the sensitivity of the measurement to yield an impedance difference between the impedance of the medium behind the measured section and the calibration impedance associated with the calibration waveform. The sensitivity can be determined, in advance either experimentally or with a sufficiently accurate numerical model, by comparing the normalized cementation signals for a range of impedances behind casings of given dimensions, with given geometric relations between the transducer and the casing. Alternatively, the impedance may be derived by access to impedance tables. The tables are accessed by the difference between the calibrated signal and the cementation signal.

Figure 11:
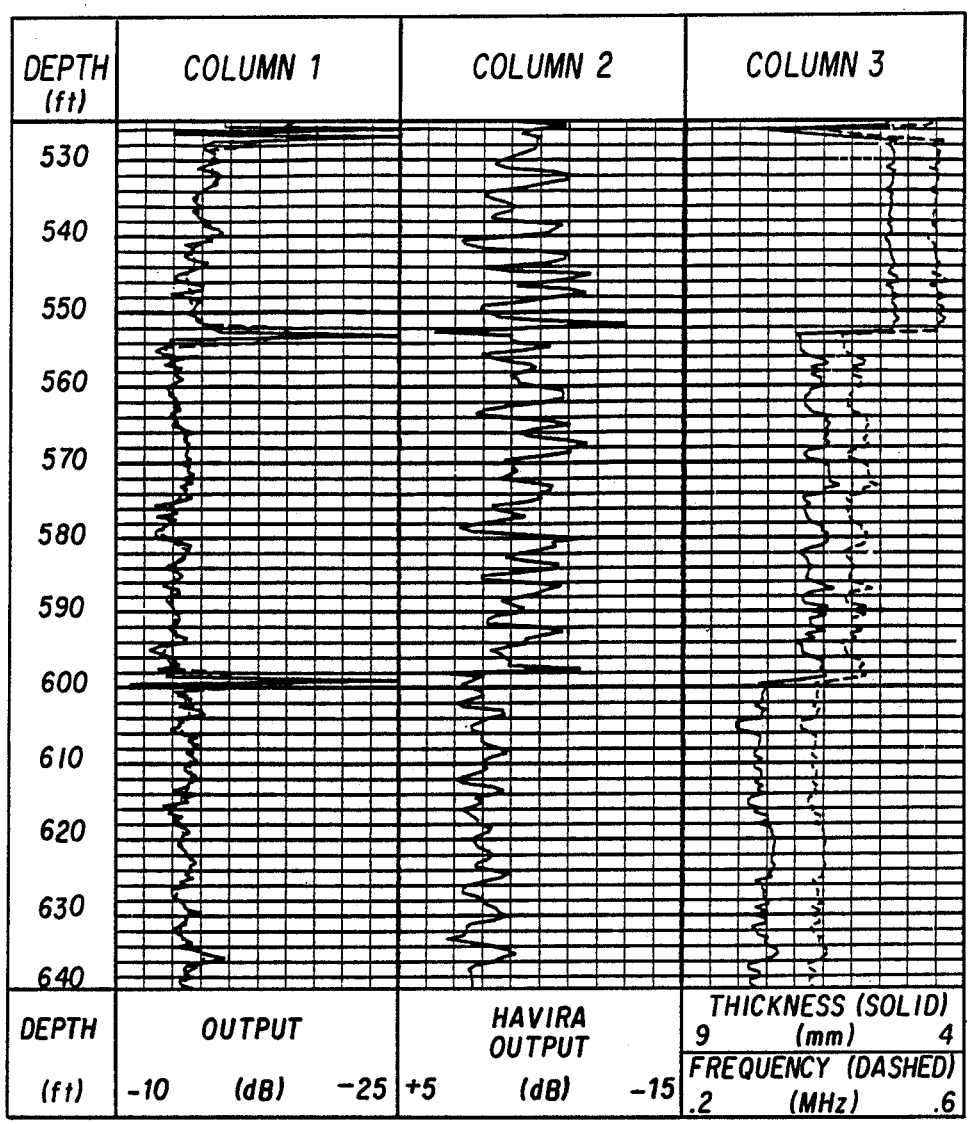
FIG. 11 shows a log obtained by the present invention.

The present invention was applied to data taken at the American Petroleum Institute Test Well #1, at Texas Agriculture and Mining University, College Station, Tex. This well was built to test cement evaluation techniques and contains a variety of casing sizes and thicknesses under freepipe conditions, i.e., with water behind the casing. FIG. 11 gives the technique's output for transducer number 7 over an interval from 525 to 640 feet as the solid line in column 1. The nearly-overlaying dashed line represents the average of the present invention's output for all eight transducers. The corresponding output for the Havira technique is shown in column 2. Column 3 gives the thickness as a solid line, and the modal frequency as a dashed line as determined by the present invention; the three different casing thicknesses which occur in this interval are clearly indicated in the thickness curves of column 3 an as spikes (caused by casing collars) in column 1. Note that the technique's variance is significantly less than for the Havira technique.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What we claim as our invention is:

1. A method of calculating an impedance signal related to an acoustic impedance of material behind a section of casing in a borehole, said borehole traversing subsurface earth formations, said method analyzing a return waveform obtained from an acoustic investigation of the section of casing with an acoustic excitation pulse directed thereto, the bandwidth of said pulse selected to stimulate a thickness resonance of the casing, said return waveform including a reverberation segment and an initial reflection segment, said method comprising the steps of:
   determining the frequency of said thickness resonance from said return waveform,
   determining a time reference indicative of the time of arrival of said return waveform,
   filtering said reverberation segment in a predetermined band about said determined thickness resonance frequency, the bandwidth of said predetermined band based on said determined frequency and substantially excluding other thickness resonances;
   time windowing a portion of said filtered reverberation segment based on said time reference and said determined frequency; and
   calculating an integrated, amplitude-related measure of said windowed reverberation segment to produce an impedance signal.

2. The method of claim 1, wherein said step of filtering said reverberation segment includes:
   selecting a center frequency of said predetermined band, said center frequency selected to be near said determined frequency; and
   selecting a bandwidth of said band proportional to said determined frequency.

3. The method of claim 2, wherein said step of filtering said reverberation segment further includes applying a spectral weighting function within said band.

4. The method of claim 3, wherein said spectral weighting function has parameters scaled by said determined frequency.

5. The method of claim 3, wherein said spectral weighting function is a Gaussian function.

6. The method of claim 5, wherein said Gaussian function has a standard deviation scaled by said determined frequency.

7. The method of claim 1, wherein:
   the starting time of said portion within said filtered reverberation segment is such that the difference between said time reference and said starting time is inversely proportional to said determined frequency; and
   the time duration of said portion is inversely proportional to said determined frequency.

8. The method of claim 7, wherein said step of windowing said reverberation segment further includes the step of applying a time weighting function to said portion of said filtered reverberation segment.

9. The method of claim 8, wherein said time weighting function has parameters scaled by said determined frequency.

10. The method of claim 8, wherein said time weighting function is a Gaussian function.

11. The method of claim 10, wherein said Gaussian function has a standard deviation scaled by said determined frequency.

12. The method of claim 10, wherein the center of said Gaussian function is substantially at the center of said windowed portion of said reverberation segment.

13. The method of claim 1, further comprising the steps of:
   filtering said initial reflection segment in a predetermined band about said determined thickness resonance frequency based on said determined frequency,
   time windowing a portion of said filtered initial reflection segment based on said time reference and said determined frequency;
   calculating an integrated, amplitude-related measure of said windowed initial reflection segment; and
   dividing said integrated measure of said windowed reverberation segment by said integrated measure of said windowed initial reflection segment, producing a normalized impedance signal.

14. The method of claim 13, wherein said step of filtering said initial reflection segment includes:
   selecting a center frequency of said predetermined band, said center frequency selected to be near said determined frequency; and
   selecting a bandwidth of said band proportional to said determined frequency.

15. The method of claim 14, wherein said step of filtering said initial reflection segment further includes applying a spectral weighting function within said band.

16. The method of claim 15, wherein said spectral weighting function has parameters scaled by said determined frequency.

17. The method of claim 15, wherein said spectral weighting function is a Gaussian function.

18. The method of claim 17, wherein said Gaussian function has a standard deviation scaled by said determined frequency.

19. The method of claim 13, wherein:
   the starting time of said portion within said filtered initial reflection segment is such that the difference between said time reference and said starting time is inversely proportional to said determined frequency; and
   the time duration of said portion within said initial reflection segment is inversely proportional to said determined frequency.

20. The method of claim 19, wherein said step of windowing said initial reflection segment further includes the step of applying a time weighting function to said portion of said filtered initial reflection segment.

21. The method of claim 20, wherein said time weighting function has parameters scaled by said determined frequency.

22. The method of claim 20, wherein said time weighting function is a Gaussian function.

23. The method of claim 22, wherein said Gaussian function has a standard deviation scaled by said determined frequency.

24. The method of claim 22, wherein the center of said Gaussian function is substantially at the center of said windowed portion of said initial reflection segment.

25. The method of claim 13 further comprising the steps of
calculating the logarithm of said normalized impedance signal;
dividing said logarithm of said normalized impedance signal by a predetermined sensitivity value to obtained a scaled signal, said scaled signal indicative of relative impedance.

26. The method of claim 13, further comprising the steps of:
determining a calibration waveform from the thickness resonance of a calibration section of casing which has a medium behind it with known acoustic impedance,
determining a calibration signal therefor with the same steps which were used to obtain the normalized impedance signal,
determining a difference value corresponding to the difference between said normalized impedance signal expressed in logarithmic scale units and said calibration signal expressed in logarithmic scale units, and
determining the acoustical impedance of said material behind said casing.

27. The method of claim 26, wherein the step of determining the acoustical impedance includes the step of accessing a table of acoustical impedances based on said difference value.

28. The method of claim 26, wherein the step of determining the acoustical impedance includes the step of dividing said difference value by a predetermined sensitivity.

29. The method of claim 26, wherein the step of determining a calibrated waveform includes the step of acoustically exciting the section of casing, said section of casing having substantially similar parameters as said section of casing being investigated.

30. A method of calculating an impedance signal related to an acoustic impedance of material behind a section of casing in a borehole, said borehole traversing subsurface earth formations, said method analyzing a return waveform obtained from an acoustic investigation of the section of casing with an acoustic excitation pulse directed thereto, the bandwidth of said pulse selected to stimulate a thickness resonance of the casing, said return waveform including a reverberation segment and an initial reflection segment, said method comprising the steps of:
determining the frequency of said thickness resonance from said return waveform,
determining a time reference indicative of the time of arrival of said return waveform,
filtering said reverberation segment in a predetermined band about said determined thickness resonance frequency, said predetermined band substantially excluding other thickness resonances;
time windowing a portion of said filtered reverberation segment based on said time reference; and
calculating an integrated, amplitude-related measure of said windowed reverberation segment to produce an impedance signal.

31. The method of claim 30, wherein said step of filtering said reverberation segment includes:
selecting a center frequency of said predetermined band, said center frequency selected to be near said determined frequency.

32. The method of claim 31, wherein said step of filtering said reverberation segment further includes applying a spectral weighting function within said band.

33. The method of claim 32, wherein said spectral weighting function is a Gaussian function.

34. The method of claim 30, wherein said step of windowing said reverberation segment further includes the step of applying a time weighting function to said portion of said filtered reverberation segment.

35. The method of claim 34, wherein said time weighting function is a Gaussian function.

36. The method of claim 35, wherein the center of said Gaussian function is substantially at the center of said windowed portion of said reverberation segment.

37. The method of claim 30, further comprising the steps of:
filtering said initial reflection segment in a predetermined band about said determined thickness resonance frequency,
time windowing a portion of said filtered initial reflection segment based on said time reference;
calculating an integrated, amplitude-related measure of said windowed initial reflection segment; and
dividing said integrated measure of said windowed reverberation segment by said integrated measure of said windowed initial reflection segment, producing a normalized impedance signal.

38. The method of claim 37, wherein said step of filtering said initial reflection segment includes:
selecting a center frequency of said predetermined band, said center frequency selected to be near said determined frequency.

39. The method of claim 38, wherein said step of filtering said initial reflection segment further includes applying a spectral weighting function within said band.

40. The method of claim 39, wherein said spectral weighting function is a Gaussian function.

41. The method of claim 37, wherein said step of windowing said initial reflection segment further includes the step of applying a time weighting function to said portion of said filtered initial reflection segment.

42. The method of claim 41, wherein said time weighting function is a Gaussian function.

43. The method of claim 42, wherein the center of said Gaussian function is substantially at the center of said windowed portion of said initial reflection segment.

44. The method of claim 37 further comprising the steps of
calculating the logarithm of said normalized impedance signal;
dividing said logarithm of said normalized impedance signal by a predetermined sensitivity value to obtained a scaled signal, said scaled signal indicative of relative impedance.

45. The method of claim 37, further comprising the steps of:
determining a calibration waveform from the thickness resonance of a calibration section of casing which has a medium behind it with known acoustic impedance, determining a calibration signal therefor with the same steps which were used to obtain the normalized impedance signal, determining a difference value corresponding to the difference between said normalized impedance signal expressed in logarithmic scale units and said calibration signal expressed in logarithmic scale units, and determining the acoustical impedance of said material behind said casing.

46. The method of claim 45, wherein the step of determining the acoustical impedance includes the step of accessing a table of acoustical impedances based on said difference value.

47. The method of claim 45, wherein the step of determining the acoustical impedance includes the step of dividing said difference value by a predetermined sensitivity.

48. The method of claim 45, wherein the step of determining a calibrated waveform includes the step of acoustically exciting the section of casing, said section of casing having substantially similar parameters as said section of casing being investigated.

49. A method of calculating an impedance signal related to an acoustic impedance of material behind a section of casing in a borehole, said borehole traversing subsurface earth formations, said method analyzing a return waveform obtained from an acoustic investigation of the section of casing with an acoustic excitation pulse directed thereto, the bandwidth of said pulse selected to stimulate a thickness resonance of the casing, said return waveform including a reverberation segment and an initial reflection segment, said method comprising the steps of:

determining the frequency of said thickness resonance from said return waveform, determining a time reference indicative of the time of arrival of said return waveform, time windowing a portion of said reverberation segment based on said time reference and said determined frequency; and calculating an integrated, amplitude-related measure of said windowed reverberation segment to produce an impedance signal.

50. The method of claim 49, wherein:

the starting time of said portion within said reverberation segment is such that the difference between said time reference and said starting time is inversely proportional to said determined frequency; and the time duration of said portion is inversely proportional to said determined frequency.

51. The method of claim 50, wherein said step of windowing said reverberation segment further includes the step of applying a time weighting function to said portion of said filtered reverberation segment.

52. The method of claim 51, wherein said time weighting function has parameters scaled by said determined frequency.

53. The method of claim 51, wherein said time weighting function is a Gaussian function.

54. The method of claim 53, wherein said Gaussian function has a standard deviation scaled by said determined frequency.

55. The method of claim 53, wherein the center of said Gaussian function is substantially at the center of said windowed portion of said reverberation segment.

56. The method of claim 49, further comprising the steps of:

time windowing a portion of said initial reflection segment based on said time reference and said determined frequency;

calculating an integrated, amplitude-related measure of said windowed initial reflection segment; and dividing said integrated measure of said windowed reverberation segment by said integrated measure of said windowed initial reflection segment, producing a normalized impedance signal.

57. The method of claim 56, wherein:

the starting time of said portion within said initial reflection segment is such that the difference between said time reference and said starting time is inversely proportional to said determined frequency; and the time duration of said portion within said initial reflection segment is inversely proportional to said determined frequency.

58. The method of claim 57, wherein said step of windowing said initial reflection segment further includes the step of applying a time weighting function to said portion of said initial reflection segment.

59. The method of claim 58, wherein said time weighting function has parameters scaled by said determined frequency.

60. The method of claim 58, wherein said time weighting function is a Gaussian function.

61. The method of claim 60, wherein said Gaussian function has a standard deviation scaled by said determined frequency.

62. The method of claim 60, wherein the center of said Gaussian function is substantially at the center of said windowed portion of said initial reflection segment.

63. The method of claim 56 further comprising the steps of calculating the logarithm of said normalized impedance signal;

dividing said logarithm of said normalized impedance signal by a predetermined sensitivity value to obtained a scaled signal, said scaled signal indicative of relative impedance.

64. The method of claim 56, further comprising the steps of:

determining a calibration waveform from the thickness resonance of a calibration section of casing which has a medium behind it with known acoustic impedance, determining a calibration signal therefor with the same steps which were used to obtain the normalized impedance signal, determining a difference value corresponding to the difference between said normalized impedance signal expressed in logarithmic scale units and said calibration signal expressed in logarithmic scale units, and determining the acoustical impedance of said material behind said casing.

65. The method of claim 64, wherein the step of determining the acoustical impedance includes the step of accessing a table of acoustical impedances based on said difference value.

66. The method of claim 64, wherein the step of determining the acoustical impedance includes the step of dividing said difference value by a predetermined sensitivity.

67. The method of claim 64, wherein the step of determining a calibrated waveform includes the step of acoustically exciting the section of casing, said section of casing having substantially similar parameters as said section of casing being investigated.

* * * * *